(12) United States Patent
Plettenberg

(10) Patent No.: US 6,621,243 B2
(45) Date of Patent: Sep. 16, 2003

(54) DRIVE UNIT FOR A MOVABLE PART OF A VEHICLE

(75) Inventor: Paul Theodora Maria Plettenberg, Belmond (NL)

(73) Assignee: Inalfa Industries B.V. (NL)

( * ) Notice: Subject to any disclaimer, the term of this patent is extended or adjusted under 35 U.S.C. 154(b) by 0 days.

(21) Appl. No.: 10/188,200

(22) Filed: Jul. 2, 2002

(65) Prior Publication Data

US 2003/0011216 A1 Jan. 16, 2003

(30) Foreign Application Priority Data

Jul. 13, 2001 (DE) .......................... 101 34 134

(51) Int. Cl.[7] .............................................. B60J 7/057
(52) U.S. Cl. ..................................... 318/286; 388/903
(58) Field of Search ................................. 318/264, 265, 318/266, 286, 466, 467, 468, 469, 434; 388/903

(56) References Cited

U.S. PATENT DOCUMENTS

| | | | | |
|---|---|---|---|---|
| 3,732,787 A | * | 5/1973 | Yamaguchi | |
| 4,930,255 A | * | 6/1990 | Sea | 49/63 |
| 4,980,591 A | * | 12/1990 | Takanashi et al. | 310/83 |
| 5,039,925 A | * | 8/1991 | Schap | 318/282 |
| 6,161,671 A | * | 12/2000 | Sakamoto et al. | 192/82 T |
| 6,369,537 B1 | | 4/2002 | Vordermaier et al. | 318/282 |
| 6,416,092 B1 | | 7/2002 | Rathmann | 292/336.3 |

FOREIGN PATENT DOCUMENTS

| | | |
|---|---|---|
| DE | 19803531 | 8/1999 |
| DE | 19855094 | 5/2000 |
| DE | 19834823 | 4/2002 |
| DE | 19841729 | 7/2002 |

* cited by examiner

*Primary Examiner*—Bentsu Ro
(74) *Attorney, Agent, or Firm*—Westman, Champlin & Kelly, P.A.; S. Koehler

(57) ABSTRACT

The invention relates to a drive unit for a closure of an open roof construction. It comprises an electric motor having a drive shaft and transmission means and an electric circuit including said motor and control means to actuate the motor. An emergency clutch is coupled to at least one of the drive shaft and the transmission means and is reachable to enable hand actuation of the movable part in case of an emergency. The emergency clutch is covered by a part of the electric circuit, which must be disconnected to reach the clutch. The part of the electronic circuit is provided on a breakable seal, which is a pierceable metal foil strip. As a result it is possible to observe the use of the clutch, either visibly or electronically.

8 Claims, 1 Drawing Sheet

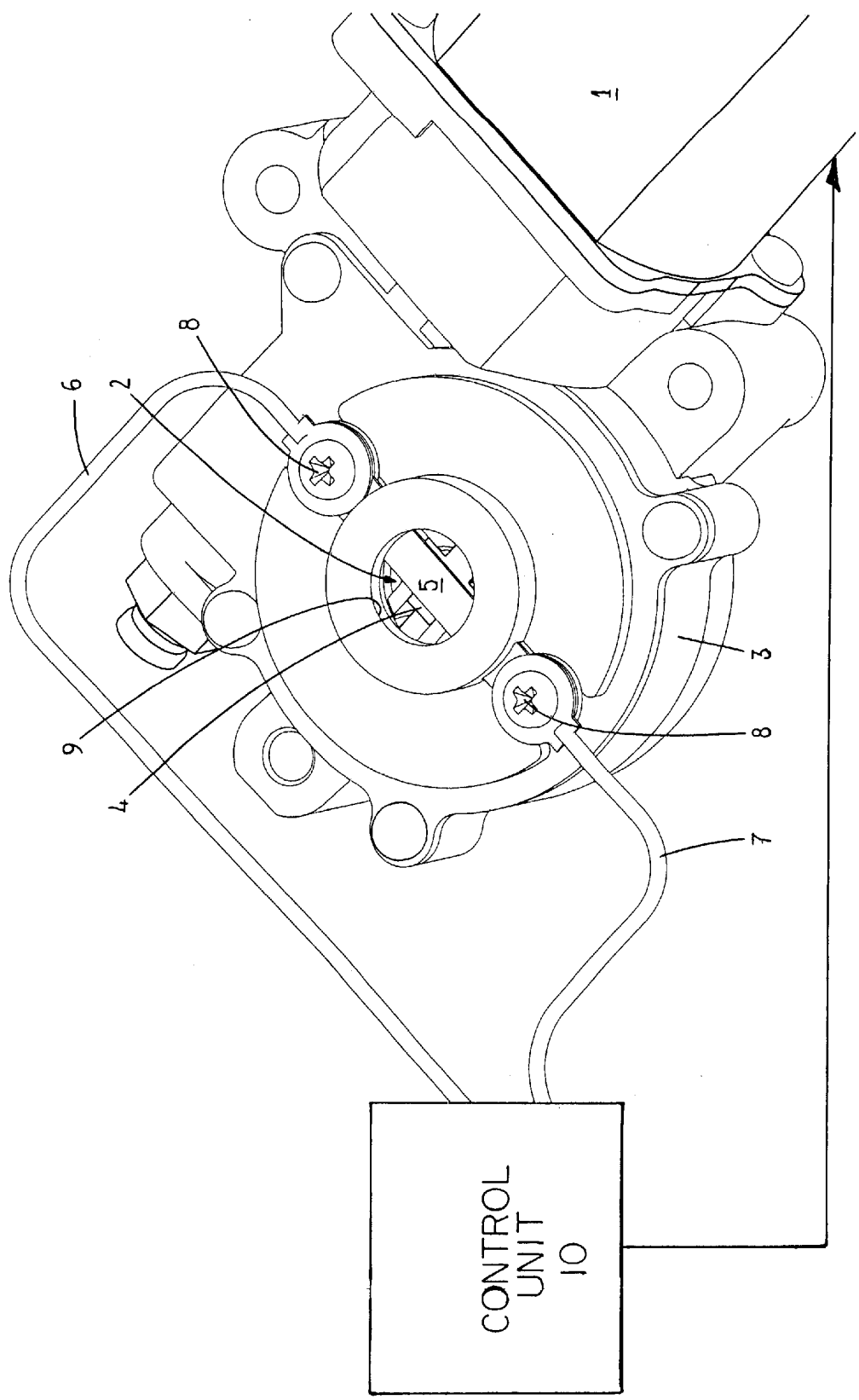

DRIVE UNIT FOR A MOVABLE PART OF A VEHICLE

BACKGROUND OF THE INVENTION

The present invention relates to a drive unit for a movable part of a vehicle, such as a closure of an open roof construction.

Such drive units are known in various embodiments. An emergency clutch is normally used if the electric motor does not function anymore, for example if there is no voltage. In most embodiments it is necessary to use a tool, such as a screw driver, which must be inserted into the emergency clutch in order to rotate the axis of the motor and thereby the movable part of the vehicle.

If the drive unit is used in combination with a computer control unit, it is important for the control unit to know the position of the movable part. Normally, this position is measured by one or more electronic counters. If the movable part is manually adjusted through the emergency clutch, the actual position of the movable part will be different from the position stored in the memory of the control unit. This can lead to failures in the operation of the movable part.

There thus is a need to provide a drive unit with which this drawback can be removed.

SUMMARY OF THE INVENTION

According to an aspect of the invention, a drive unit includes an electric motor having a drive shaft and a transmission. An electric circuit includes said motor and a controller to actuate the motor. An emergency clutch is coupled to at least one of the drive shaft and transmission and reachable to enable hand actuation of the movable part in case of an emergency. The emergency clutch is covered by a part of the electric circuit, which is arranged such that it must be disconnected to reach the clutch.

Because of the necessity to disconnect the electric circuit to reach the clutch, it is possible to observe the use of the clutch, either visibly, electronically or the like. Then, measures can be taken to ensure a correct operation of the movable part, for example by manually or automatically resetting the control unit, or by disabling certain functions of the control unit.

In one embodiment, part of the electronic circuit is provided on a breakable seal, such as a pierceable metal foil. From the condition of the seal it can always be deduced when the clutch has been used or reached, since the disruption is irreversible. Preferably, the seal is mounted such that an expert can very easily replace the electric seal.

If the part of the electric circuit is a detection circuit, the control unit will detect the disconnection in the electric circuit and can make a programmed decisions, for example to reset automatically or to disable certain functions.

Another aspect of the present invention also includes an open roof construction for a vehicle, such as a passenger car, comprising such drive unit.

BRIEF DESCRIPTION OF THE DRAWINGS

The invention will hereafter be further elucidated with reference to the drawing showing an embodiment of the drive unit according to the invention.

DETAILED DESCRIPTION OF THE ILLUSTRATIVE EMBODIMENT

The only FIGURE in the drawing is a perspective view of a part of this embodiment of the drive unit according to the invention.

The drawing shows a drive unit which is intended to be used in an open roof construction for a vehicle, such as a panel roof, a folding roof, a slatted roof or the like, but it should be kept in mind that the invention could also be used for other movable parts of a vehicle, such as convertible covers, sliding windows or the like.

The drive unit comprises an electric motor 1 having an output or drive shaft 2 and a transmission in the transmission housing 3. The drive unit comprises an integrated control unit or is connectable to a control unit 10 of the vehicle, herein illustrated, and includes an electric circuit to connect the various parts of the electric unit and to energize the motor 1.

In order to be able to adjust the movable part even if the electric drive does not work, the drive unit is provided with an emergency clutch 4 which is coupled to the drive shaft 2 and/or the transmission and is reachable, for example by a tool such as a screw driver, to enable hand actuation of the movable part.

As is shown in the drawing, the emergency clutch 4 is covered by a breakable seal in the form of a pierceable metal foil 5. This metal foil 5 forms part of the electric circuit, in this case a detection loop comprising electric conductors 6 and 7 which are clamped by screws 8 to the ends of the metal foil 5. The metal foil 5 extends over an access opening 9 in the transmission housing 3 and covers the emergency clutch 4, so that the clutch can only be reached if the metal foil 5 is pierced and moved out of the way in the access opening 9. Due to the piercing of the metal foil 5, the detection loop in the electric circuit is disconnected irreversibly and this can be detected electronically and/or visibly. An expert may easily replace the metal foil 5 by loosening the screws 8, placing a new metal foil 5 and tightening the screws 8 again. The control unit can then be reset automatically or manually in order to ensure a further proper operation of the open roof construction.

From the foregoing it will be clear that the invention provides a fail safe drive unit having an emergency clutch.

The invention is not restricted to the embodiment shown in the drawing and described herein before, which may be varied in different ways within the scope of the accompanying claims. For example, the disconnectable part of the electric circuit may be a switch or other reversibly or irreversibly disruptable connection.

What is claimed is:

1. A drive unit for a movable part of a vehicle, comprising:
   an electric motor having a drive shaft and a transmission;
   an electric circuit including said motor and a control unit to actuate the motor; and
   an emergency clutch coupled to at least one of the drive shaft and the transmission and reachable to enable hand actuation of the movable part in case of an emergency, the emergency clutch being covered by a part of the electric circuit, which is arranged such that the part must be disconnected to reach the clutch.

2. The drive unit according to claim 1, wherein the part of the electric circuit is provided on a breakable seal.

3. The drive unit according to claim 2, wherein the seal is a pierceable metal foil.

4. The drive unit according to claim 3, wherein the metal foil is a strip, the ends of which are adapted to be clamped to corresponding conductors of the circuit.

5. The drive unit according to claim 1, wherein the emergency clutch is provided in a housing of the drive unit and is reachable through an access opening, the part of the electric circuit being provided over the access opening.

6. The drive unit according to claim 1, wherein the part of the electric circuit is a detection circuit.

7. A drive unit for a closure element of an open roof construction for a vehicle, comprising:

an electric motor having a drive shaft and a transmission;

an electric circuit including said motor and a control unit to actuate the motor; and an emergency clutch coupled to at least one of the drive shaft and the transmission and reachable to enable hand actuation of the closure element in case of an emergency, the emergency clutch being covered by a part of the electric circuit, which is arranged such that the part must be disconnected to reach the clutch.

8. An open roof construction for a vehicle having an opening in the fixed roof, a closure element to selectively open and close the roof opening and a drive unit for said closure element, said drive unit comprising:

an electric motor having a drive shaft and a transmission;

an electric circuit including said motor and control unit to actuate the motor; and an emergency clutch coupled to at least one of the drive shaft and the transmission and reachable to enable hand actuation of the closure element in case of an emergency, the emergency clutch being covered by a part of the electric circuit, which is arranged such that it must be disconnected to reach the clutch.

* * * * *